United States Patent
Zhang et al.

(10) Patent No.: US 10,630,361 B2
(45) Date of Patent: *Apr. 21, 2020

(54) METHOD FOR FEEDING BACK CHANNEL STATE INFORMATION, UE AND SYSTEM

(71) Applicant: FUJITSU CONNECTED TECHNOLOGIES LIMITED, Kawasaki-shi, Kanagawa (JP)

(72) Inventors: Yi Zhang, Beijing (CN); Yi Wang, Beijing (CN); Yueqiao Xu, Beijing (CN); Hongchao Li, Beijing (CN); Hua Zhou, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,515

(22) Filed: Feb. 10, 2016

(65) Prior Publication Data

US 2016/0164591 A1   Jun. 9, 2016

Related U.S. Application Data

(63) Continuation of application No. 14/556,961, filed on Dec. 1, 2014, which is a continuation of application No. PCT/CN2012/077116, filed on Jun. 18, 2012.

(51) Int. Cl.
*H04B 7/06* (2006.01)
*H04L 5/00* (2006.01)
(Continued)

(52) U.S. Cl.
CPC .......... *H04B 7/0626* (2013.01); *H04B 7/024* (2013.01); *H04B 7/0456* (2013.01); *H04B 7/063* (2013.01);
(Continued)

(58) Field of Classification Search
CPC .... H04B 7/024; H04B 7/0456; H04B 7/0621; H04B 7/0626; H04B 7/0636;
(Continued)

(56) References Cited

U.S. PATENT DOCUMENTS

2008/0305745 A1* 12/2008 Zhang .................. H04L 1/0026
                                                        455/67.11
2009/0245169 A1    10/2009 Zhang et al.
(Continued)

FOREIGN PATENT DOCUMENTS

| CN | 102075293 | 5/2011 |
|---|---|---|
| CN | 102377469 | 3/2012 |

(Continued)

OTHER PUBLICATIONS

Notice of Preliminary Rejection issued by the Korean Intellectual Property Office for corresponding Korean Patent Application No. 10-2014-7034806, dated Feb. 25, 2016, with English translation.
(Continued)

*Primary Examiner* — Joshua Kading
(74) *Attorney, Agent, or Firm* — Myers Wolin, LLC (57) ABSTRACT

A method for feeding back channel state information, applicable to a coordinated multi-point (CoMP) transmission system, the method includes; arranging more than one piece of channel state information in a source bit domain by way of concatenating the more than one piece of channel state information in a bit domain; performing corresponding processing and mapping to a resource of the arranged more than one piece of channel state information; and transmitting the processed and mapped more than one piece of channel state information to the network side of the CoMP transmission system, wherein the more than one piece of channel state information are arranged in the source bit domain in an order of the configured channel state information.

7 Claims, 8 Drawing Sheets

(51) Int. Cl.
  *H04L 1/00* (2006.01)
  *H04B 7/024* (2017.01)
  *H04B 7/0456* (2017.01)
  *H04L 1/16* (2006.01)

(52) U.S. Cl.
  CPC ......... *H04B 7/0621* (2013.01); *H04B 7/0632* (2013.01); *H04B 7/0634* (2013.01); *H04B 7/0639* (2013.01); *H04L 1/003* (2013.01); *H04L 1/0031* (2013.01); *H04L 5/0035* (2013.01); *H04L 1/1607* (2013.01)

(58) Field of Classification Search
  CPC .... H04B 7/0641; H04B 7/0643; H04B 7/063; H04B 7/0634; H04B 7/0639; H04B 7/066; H04L 5/0035; H04L 5/0053; H04L 5/0057; H04L 1/0687; H04L 1/0693; H04L 27/2646; H04L 5/0037–0041
  See application file for complete search history.

(56) References Cited

U.S. PATENT DOCUMENTS

| | | |
|---|---|---|
| 2010/0027456 A1 | 2/2010 | Onggosanusi et al. |
| 2010/0272019 A1 | 10/2010 | Papasakellariou et al. |
| 2011/0128942 A1* | 6/2011 | Kim ................. H04B 7/0639 370/336 |
| 2011/0235608 A1* | 9/2011 | Koo ................. H04B 7/024 370/329 |
| 2011/0249578 A1* | 10/2011 | Nayeb Nazar ....... H04L 1/0027 370/252 |
| 2011/0249643 A1 | 10/2011 | Barbieri et al. |
| 2011/0310786 A1 | 12/2011 | Qin et al. |
| 2012/0087254 A1* | 4/2012 | Yin ................. H04L 1/0031 370/252 |
| 2012/0127869 A1 | 5/2012 | Yin et al. |
| 2013/0083681 A1* | 4/2013 | Ebrahimi Tazeh Mahalleh ......... H04L 5/0057 370/252 |
| 2013/0250788 A1* | 9/2013 | Kim ................. H04W 24/10 370/252 |
| 2013/0301448 A1* | 11/2013 | Sayana ............. H04W 24/10 370/252 |
| 2013/0301548 A1* | 11/2013 | Etemad ............. H04W 4/70 370/329 |
| 2015/0085750 A1* | 3/2015 | Zhang ............. H04L 1/0031 370/328 |
| 2015/0117351 A1* | 4/2015 | Nagata ............. H04J 1/00 370/329 |
| 2018/0234136 A1* | 8/2018 | Marinier ........... H04B 7/024 |

FOREIGN PATENT DOCUMENTS

| | | |
|---|---|---|
| CN | 102480344 | 5/2012 |
| KR | 10-2010-0126550 A | 12/2010 |
| WO | 2011/040751 A2 | 4/2011 |
| WO | 2011/040751 A3 | 4/2011 |
| WO | 2011/085817 A1 | 7/2011 |

OTHER PUBLICATIONS

Extended European search report with supplementary European search report and the European search opinion issued by the European Patent Office for corresponding European Patent Application No. 12879443.5, dated Nov. 5, 2015.
International Search Report issued for corresponding International Patent Application No. PCT/CN2012/077116, dated Mar. 28, 2013, with an English Translation.
1st Office Action issued by the Japan Patent Office for corresponding Japanese Patent Application No. 2015-516407, dated Feb. 23, 2016, with an English translation.
Alcatel-Lucent Shanghai Bell et al., "UCI Multiplexing on PUSCH for DL CoMP", Agenda Item: 7.5.6.3, 3GPP TSG-RAN WG1 Meeting #69, R1-122491, Prague, Czech Republic, May 21-25, 2012.
Notice of Preliminary Rejection issued by the Korean Intellectual Property Office for corresponding Korean Patent Application No. 10-2014-7034806, dated Jul. 19, 2016, with English translation.
Non-Final Office Action issued by the United States Patent and Trademark Office for corresponding U.S. Appl. No. 14/556,961, electronically delivered on Nov. 4, 2016.
First Office Action and search report issued by the State Intellectual Property Office of China for corresponding Chinese Patent Application No. 201280073112.9, dated Jan. 4, 2017, with an English translation.
Second notification of Office Action and search report issued by the State Intellectual Property Office of China for corresponding Chinese Patent Application No. 201280073112.9, dated Oct. 23, 2017, with an English translation.
Non-Final Office Action issued by the United States Patent and Trademark Office for corresponding U.S. Appl. No. 14/556,961, electronically delivered on Oct. 5, 2017.
Final Office Action issued by the United States Patent and Trademark Office for corresponding U.S. Appl. No. 14/556,961, electronically delivered on May 1, 2017.
Notification of Reasons for Refusal issued by the Japan Patent Office for corresponding Japanese Patent Application No. 2016-219259, dated Jan. 30, 2018, with an English translation.
Third notification of Office Action and search report issued by the State Intellectual Property Office of China for corresponding Chinese Patent Application No. 201280073112.9, dated Apr. 23, 2018, with an English translation.
Communication pursuant to Article 94(3) EPC issued by the European Patent Office for corresponding European Patent Application No. 12 879 443.5-1220, dated Feb. 13, 2018.
Notification of Reasons for Refusal issued by the Japan Patent Office for corresponding Japanese Patent Application No. 2016-219259, dated Jun. 26, 2018, with an English translation.
Non-Final Office Action issued by the United State Patent and Trademark Office for corresponding U.S. Appl. No. 14/556,961, electronically delivered on Jul. 2, 2018.
Final Office Action issued by the United States Patent and Trademark Office for corresponding U.S. Appl. No. 14/556,961, electronically delivered on Nov. 8, 2018.
Communication pursuant to Article 94(3) EPC issued by the European Patent Office for corresponding European Patent Application No. 12 879 443.5-1220, dated Feb. 20, 2019.
Non-Final Office Action issued by the United States Patent and Trademark Office for corresponding U.S. Appl. No. 14/556,961, electronically delivered on Apr. 5, 2019.
European Office Action issued for corresponding European application No. 12 879 443.5, dated Aug. 1, 2019.

* cited by examiner

METHOD FOR FEEDING BACK CHANNEL STATE INFORMATION, UE AND SYSTEM

CROSS-REFERENCE TO RELATED APPLICATIONS

This is application is a continuation of U.S. application Ser. No. 14/556,961, filed Dec. 1, 2014, which is a continuation of International Application No. PCT/CN2012/077116, filed on Jun. 18, 2012, now pending, the contents of each are herein wholly incorporated by reference.

TECHNICAL FIELD

The present invention relates to the field of communications, and in particular to a method for feeding back channel state information, UE and system.

BACKGROUND ART

In a long-term evolution advanced (LTE-A) system, a coordinated multi-point (CoMP) transmission technology is introduced to enhance performance of a cell-edge user, and improve an average throughput of the cell at the same time.

In LTE-A Rel. 11, a downlink CoMP technology is standardized for joint transmission (JT), dynamic point selection and coordinated scheduling/beamforming. In order to accurately perform link adaptive transmission and effectively obtain a gain of the CoMP transmission, UE needs to accurately feed back for different transmission assumptions.

As the UE is limited in an actual processing ability, the number of pieces of channel state information (CSI) reported by the UE is limited. In the CoMP transmission, as multiple pieces of CSI corresponding to different transmission points and interference assumptions need to be reported, there is no effective method for reporting CSI at present for the CoMP transmission.

SUMMARY OF THE INVENTION

An object of embodiment of the present invention is to provide a method for feeding back channel state information, UE and system; wherein feedback of multiple pieces of CSI in CoMP transmission is achieved by concatenating the multiple pieces of CSI in a bit domain.

According to one aspect of the embodiments of the present invention, there is provided a method for feeding back channel state information, applicable to a CoMP transmission system, the method including:

feeding back channel state information to a network side by way of concatenating more than one pieces of channel state information in a bit domain.

According to another aspect of the embodiments of the present invention, there is provided a method for feeding back channel state information, applicable to a CoMP transmission system, the method including:

selecting one piece of channel state information from a channel state information set indicating feedback; and transmitting the selected channel state information and signaling indicating the selected channel state information to a network side.

According to still another aspect of the embodiments of the present invention, there is provided UE, including:

a feedback unit configured to feed back channel state information to a network side by way of concatenating more than one pieces of channel state information in a bit domain.

According to still another aspect of the embodiments of the present invention, there is provided UE, including:

a selecting unit configured to select one piece of channel state information from a channel state information set indicating feedback; and a transmitting unit configured to transmit the selected channel state information and signaling indicating the selected channel state information to a network side.

According to still another aspect of the embodiments of the present invention, there is provided a network system, including a macro base station, one or more pico base stations and UE; wherein the UE is the UE as described above.

According to still another aspect of the embodiments of the present invention, there is provided a computer-readable program, wherein when the program is executed in UE, the program enables a computer to carry out the method for feeding back channel state information as described above in the UE.

According to still another aspect of the embodiments of the present invention, there is provided a storage medium in which a computer-readable program is stored, wherein the computer-readable program enables a computer to carry out the method for feeding back channel state information as described above in UE.

An advantage of the embodiments of the present invention resides in that a method for feeding back multiple pieces of CSI in a CoMP transmission may be provided. Furthermore, RI information and CQI information in the CSI may be respectively encoded and mapped, so as to ensure reliable transmission of them. In addition, taking working amount of simplification of standardization into account, a manner of feeding back RI information and CQI/PMI information in an existing LTE system is reused.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the embodiments of the invention will be or become apparent upon examination of the following drawings and detailed description. In the drawings.

DETAILED DESCRIPTION OF THE INVENTION

Various embodiments of the present invention are described as follows with reference to the drawings. These embodiments are illustrative only, and are not intended to limit the present invention. For the principle and modes of implementation of the present invention to be easily understood by those skilled in the art, the modes of implementation of the present invention shall be described taking determination of a method for feeding back channel state information in a CoMP transmission system as an example. However, it should be understood that the present invention is not limited to the above system, and is applicable to other systems related to feeding back channel state information.

Currently, in LTE Rel. 10, periodic and aperiodic feedback modes are used to provide feedback information of different granularities to UE, so as to improve performance of the system. Wherein, the aperiodic feedback mode is suitable for a feedback demand of CoMP, as it has advantages of a large capacity and small delay. Hence, in this embodiment, for a CoMP transmission scenario, description is given taking that CSI in different transmission points and different interference assumptions is fed back aperiodically as an example.

In this embodiment, a base station may trigger aperiodic feedback of CSI via dynamic control information (DCI). Corresponding to a CoMP transmission mode, when triggering in a common search space, a 1-bit request domain in DCI format 0 or DCI format 4 is used to trigger the aperiodic feedback of the CSI; and when triggering in a UE search space, a 2-bit CSI request domain in DCI format 0 or DCI format 4 is used to trigger the aperiodic feedback of the CSI.

In this embodiment, for the aperiodic feedback in the CoMP transmission, one or more pieces of channel state information may be included; wherein, each piece of channel state information (CSI) includes following information: rank indication (RI) information, precoding matrix indication (PMI) information, and channel quality indication (CQI) information. Wherein, multiple different combinations of the RI/PMI/CQI may be employed according to different feedback modes. For example, when the PMI/CQI are discarded, the UE may use a mode 2-0 to feed back wideband CQI, UE selection subband CQI information and subband indication information; and the user uses a mode 3-0 to feed back wideband CQI and subband CQI information configured via a high layer, such configuration being suitable for an aperiodic feedback requirement of CoMP UE in a TDD system. And when the PMI/CQI are not discarded, the UE uses a mode 1-2 to feed back RI information, wideband CQI and subband PMI information; or uses 2-2 to feed back RI information, wideband CQI, UE selection subband differential CQI information, subband selection identification information and wideband precoding information; or uses a mode 3-1 to feed back RI information, wideband CQI, subband CQI and wideband PMI information, as shown in Table 1.

TABLE 1

| | | PMI feedback type | | |
|---|---|---|---|---|
| | | No PMI | Single PMI | Multiple PMI |
| PUSCH CQI Feedback Type | Wideband (Wideband CQI) | | | Mode 1-2 |
| | UE selected (subband CQI) | Mode 2-0 | | Mode 2-2 |
| | Higher Layer-configured (subband CQI) | Mode 3-0 | Mode 3-1 | |

A network side, such as a macro base station, configures each piece of CSI with a CSI-RS resource of non-zero power and an interference part measurement resource of non-zero power, and the UE may use these resources to measure and report the CSI. In the CoMP transmission, multiple pieces of CSI corresponding to multiple transmission points (TPs) and interference assumptions need to be reported. Wherein, the multiple pieces of CSI may be multiplexed in a physical uplink shared channel (PUSCH) for transmission.

As UE is limited in an actual processing ability at present, the number of feedback pieces of CSI is limited. In this embodiment, the CSI is fed back to a network side by concatenating more than one pieces of CSI in a bit domain. In this way, the above problem may be solved, and it is not only applicable to a CoMP scenario, but also applicable to a multicarrier scenario and a scenario where aperiodic report of CSI is triggered in a common space. Wherein, according to an actual situation, a UE feedback receiving point may be a macro base station at the network side, and may also be all base stations at the network side. The embodiments of the present invention shall be described below in detail with reference to the drawings taking aperiodic feedback as an example.

Figure 1:
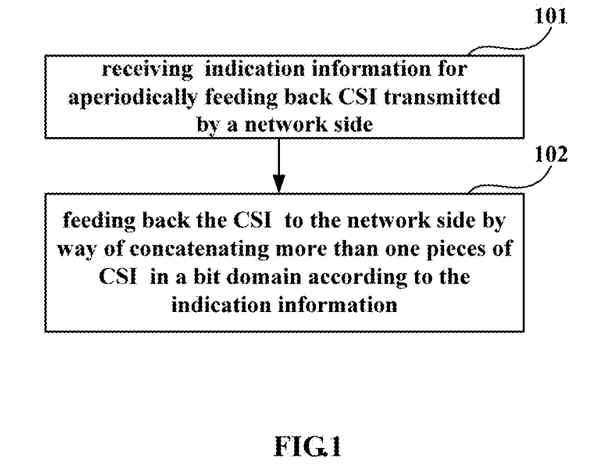
FIG. 1 is a flowchart of a method for feeding back channel state information of Embodiment 1 of the present invention.

FIG. 1 is a flowchart of a method for feeding back channel state information of Embodiment 1 of the present invention. As shown in FIG. 1, the method includes:

step 101: receiving, by UE, indication information for aperiodically feeding back CSI transmitted by a network side;

in this embodiment, the network side may indicate, via DCI, to aperiodically feed back the CSI, the number of pieces of the CSI needing to be fed back is 1 or more than 1;

in this embodiment, the macro base station or all the base stations at the network side may trigger the aperiodic feedback; and when the number of pieces of the fed back CSI is 1, a mode in the existing Rel. 8 may be employed, which shall not be described herein any further. A case where more than 1 pieces of CSI are fed back shall be described below;

step 102: feeding back the CSI, by the UE to the network side by way of concatenating more than one pieces of CSI in a bit domain;

in this embodiment, if the aperiodic feedback is triggered according to a transmission point or a CSI-RS resource of non-zero power, the UE needs to report CSI in an aperiodic CSI set corresponding to multiple different interference assumptions; and if the aperiodic feedback is triggered according to the CSI, the UE needs to report corresponding CSI. With the above embodiment, a method for feeding back multiple pieces of CSI in a CoMP transmission is provided, and multiple pieces of CSI may be fed back to the network side, without being limited by a processing ability of the UE.

In this embodiment, step 102 may be executed in multiple ways, so as to independently concatenate rank indication (RI) information, precoding matrix indication (PMI) information and/or channel quality indication (CQI) information in the channel state information in the bit domain, which shall be respectively described below with reference to the drawings.

Figure 2:
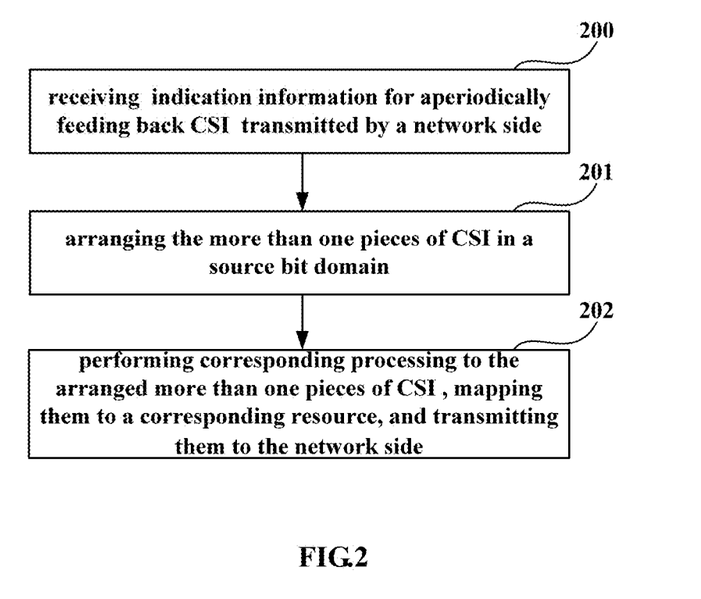
FIG. 2 is a flowchart of a method for feeding back channel state information of Embodiment 2 of the present invention.

FIG. 2 is a flowchart of a method for feeding back CSI of Embodiment 2 of the present invention. As shown in FIG. 2, the method includes:

step 200: similar to step 101, which shall not be described herein any further;

step 201: arranging the more than one pieces of CSI in a source bit domain;

in this embodiment, it can be known that more than one pieces of CSI need to be fed back according to the indication information of the aperiodic feedback; in this way, the CSI needing to be fed back is arranged in the source bit domain in a certain order;

wherein, the RI information and the PMI/CQI information are respectively concatenated in the bit domain;

step 202: performing corresponding processing to the arranged more than one pieces of CSI, mapping them to a corresponding resource, and transmitting them to the network side;

in this embodiment, different encoding and mapping manners are employed for different CSI, such as RI information and PMI/CQI information; in this way, performance requirements of the RI information and PMI/CQI information may be ensured; and the processes of processing and mapping are similar to those in the prior art, which may simplify a working amount of standardization. Following description is given by way of examples.

Figure 3A:
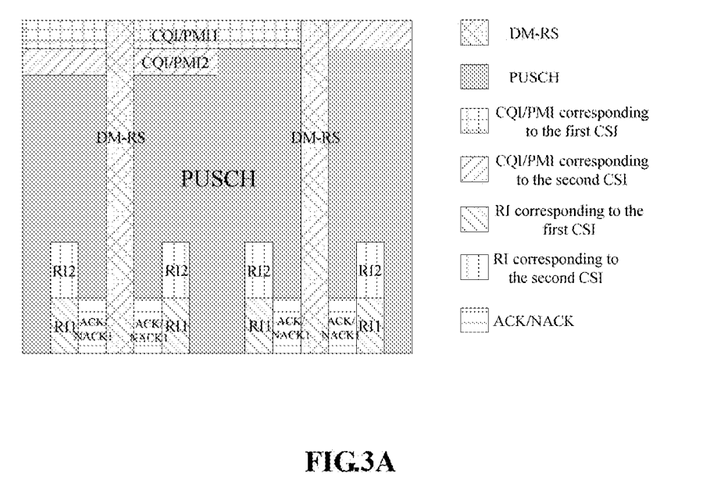
FIG. 3A is a schematic diagram of resource mapping relationship.

For example, for the RI information, when the total number of the arranged bits is less than or equal to 2, the block encoding in Rel. 8 may be used; when the number of bits is less than 12 and greater than 2, RM (reed-Muller) encoding of (32, O) is used; and when the number of bits is greater than 11, dual RM (reed-Muller) encoding of (32, O) is used. A needed number of the bits is obtained from the encoded information by using cyclic shift. In mapping, the RI information is mapped into 4 OFDM symbols close to the DM-RS; that is, the mapping is performed in an order of from the time domain to the frequency domain (an inverse order of the frequency domain) according to the specified 4 OFDM symbols (for example, RI information is mapping to (1,4,7,10) in normal CP, and to (0,3,5,8) in expanding CP), as shown in FIG. 3A, with such processes of encoding and mapping being similar to those in the prior art, which shall not be described herein any further. In this way, estimated performances of them may be ensured, and reliability of transmission may be improved.

For example, for the PMI/CQI information, when the number of bits is less than 11, RM (reed-Muller) encoding of (32, O) is used; and when the number of bits is greater than 11, tail-biting convolutional encoding is performed after 8 bits of CRC are added into a source bit. A needed number of the bits is obtained from the encoded information by using cyclic shift. In this embodiment, PMI/CQI information and the PUSCH information (uplink data) are multiplexed and interleaved, and mapping is performed after the interleaving. Wherein, resources occupied by the RI information and ACK/NACK are punctured in mapping; and in performing mapping from uplink data symbols to physical resources, the PMI/CQI information is mapped first, and then the uplink data are mapped in the remaining resources, as shown in FIG. 3A.

In this embodiment, when RI information and PMI/CQI information are contained in more than one pieces of CSI, the RI information and the PMI/CQI information are respectively concatenated in the bit domain, and processing and mapping are performed independently.

It can be seen from the above embodiment that a method for feeding back multiple pieces of CSI in a CoMP transmission is provided. In the CoMP transmission mode, the multiple pieces of CSI are ordered in the source bit domain first, then corresponding encoding is performed according to the number of the ordered bits and mapped into corresponding resources, thereby feeding back the multiple pieces of CSI.

Figure 4:
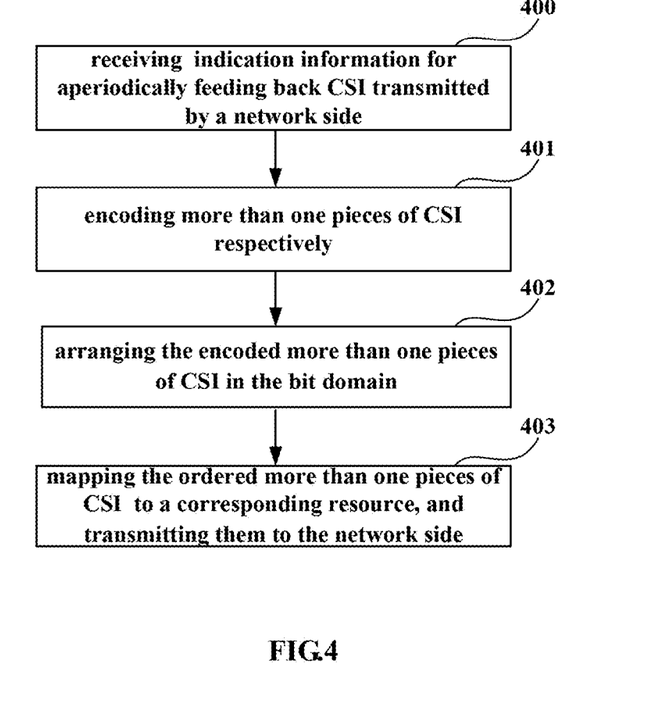
FIG. 4 is a flowchart of a method for feeding back channel state information of Embodiment 3 of the present invention.

FIG. 4 is a flowchart of a method for feeding back CSI of Embodiment 3 of the present invention. As shown in FIG. 4, the method includes:

step 400: similar to step 101, which shall not be described herein any further;

step 401: encoding more than one pieces of CSI respectively;

in this embodiment, each piece of CSI in the more than one pieces of CSI is encoded first, and RI information or PMI/CQI information is encoded respectively, with a manner of encoding being similar to that in Embodiment 2, which shall not be described herein any further;

step 402: arranging the encoded more than one pieces of CSI in the bit domain;

in this embodiment, similar to Embodiment 2, the RI information and the PMI/CQI information are ordered respectively;

step 403: mapping the ordered more than one pieces of CSI to a corresponding resource, and transmitting them to the network side;

in this embodiment, similar to Embodiment 2, the RI information and the PMI/CQI information are mapped respectively, with a process of mapping being similar to Embodiment 2, which shall not be described herein any further.

It can be seen from the above embodiment that in the CoMP transmission mode, each piece of CSI in the multiple pieces of CSI is respectively encoded first, ordered in the bit domain, and then mapped to a corresponding resource, thereby feeding back the multiple pieces of CSI.

In the above embodiment, in ordering in steps 201 and 402, ordering may be performed in any order. Furthermore, ordering may be performed in manners as follows:

1) if the aperiodic feedback is triggered according to a transmission point or a CSI-RS resource of non-zero power, in feeding back CSI in a CSI set corresponding to multiple interference assumptions, the ordering is performed in a fixed order;

for example, the ordering is performed first in an order of feeding back the channel state information corresponding to CSI-RS resource of non-zero power in the CSI set;

and then corresponding to each CSI-RS resource of non-zero power, the ordering is performed in a preconfigured order of interference assumptions; that is, the ordering is performed in an order of feeding back the corresponding interference assumptions in the CSI set; taking three transmission points and two interference sources as an example, the fixed order may be (interference started, interference started), (interference started, interference closed), (interference closed, interference started), (interference closed, interference closed). Of course, this is an embodiment of the present invention only, and it may be another order;

as another form of implementation, such a preconfigured interference order may be acquired via high-layer configuration; for example, in configuring an aperiodic CSI feedback set by the base station, CSI of different interference assumptions of the same CSI-RS of non-zero power has a configuration order, and such a configuration order may be used as an order of concatenating; that is, feedback information corresponding to CSI that is configured earlier is placed in front, and CSI that is configured later is placed behind;

2) if the aperiodic feedback is triggered according to the CSI, the UE needs to report corresponding CSI, and ordering is performed in an order of the configured CSI.

In this embodiment, when there exist two or more identical pieces of information in the more than one pieces of CSI, one piece of the information is reserved, thereby saving resources.

The method describe in the above embodiment may be applicable to a scenario of a single carrier. And for a case where CSI on multiple carriers is fed back, following method may be employed.

Figure 5:
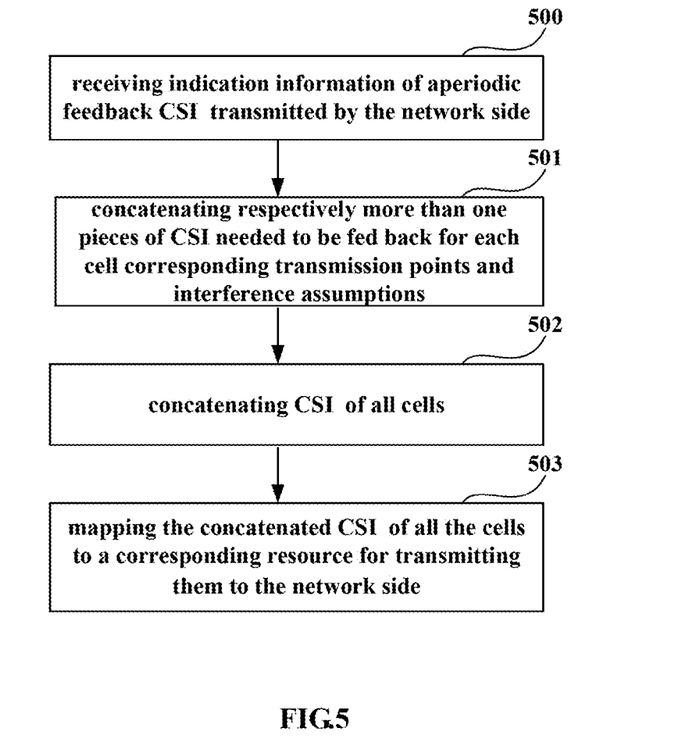
FIG. 5 is a flowchart of a method for feeding back channel state information of Embodiment 4 of the present invention.

FIG. 5 is a flowchart of a method for feeding back CSI of Embodiment 4 of the present invention. As shown in FIG. 5, the method includes:

step 500: receiving, by UE, indication information of aperiodic feedback CSI transmitted by the network side;

in this embodiment, the network side may indicate the aperiodic feedback CSI via DCI; and in a scenario of multiple carriers, the CSI needing to be fed back indicated by the indication information includes: CSI needing to be fed back on different carriers, and CSI needing to be fed back in different transmission points and interference assumptions on the same carrier;

step 501: concatenating respectively more than one pieces of CSI needed to be fed back for each cell corresponding transmission points and interference assumptions;

in this embodiment, in concatenating each cell, the methods described in embodiments 2 and 3 may be used, which shall not be described herein any further;

step 502: concatenating CSI of all cells needing to feed back channel state information;

in this embodiment, CSI of all the cells is arranged in an ascending or descending order of the cells ID;

step 503: performing corresponding processing to the concatenated CSI of all the cells, and mapping them to a corresponding resource for transmitting them to the network side;

in this embodiment, manners of processing and mapping are similar to those described in embodiments 2 and 3, which shall not be described herein any further.

In the above embodiment, possible CSI sets in the CoMP transmission are concatenated first for each carrier, and then all the carriers are concatenated.

In another mode of implementation, concatenating is performed in a carrier domain first (bit ordering), and then possible CSI sets in the CoMP transmission are concatenated for each carrier. Following is a particular process:

concatenating channel state information of all the cells needing to feed back channel state information (CSI of all the cells is arranged in an ascending or descending order of the cells ID); concatenating respectively more than one pieces of channel state information needed to be fed back for each cell (the methods in embodiments 2 and 3 may be used); and mapping the concatenated channel state information to a corresponding resource for transmitting to the network side.

Figure 3B:
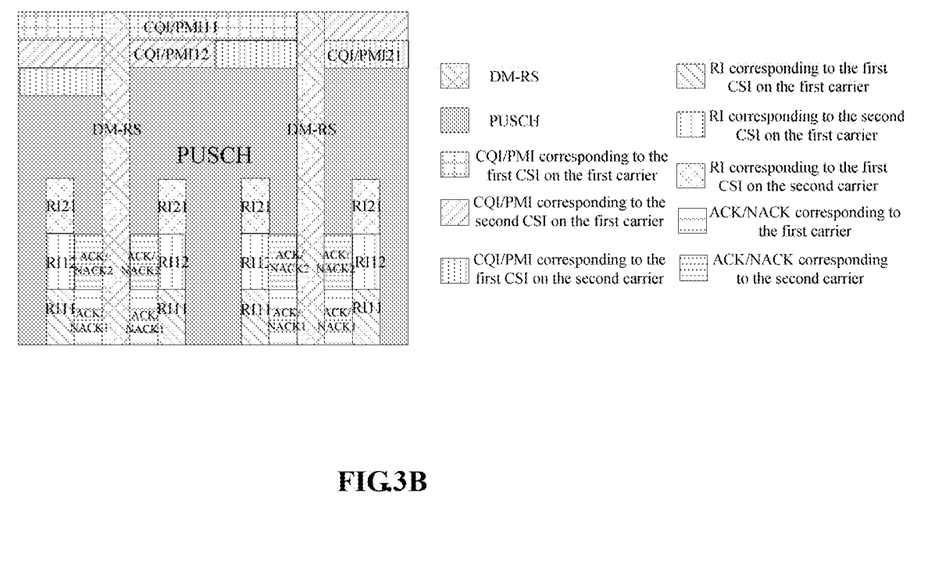
FIG. 3B is schematic diagram of resource mapping relationship.

FIG. 3B is an example of a CoMP system. Wherein, for a case where CoMP is combined with CA, in comparison with FIG. 3A, concatenating of a step of carrier domain is added. Wherein, FIG. 3B does not mean that concatenating is performed before and after encoding, but means an order in ordering. Wherein, numbers "11" and "12" are a first piece of CSI and a second piece of CSI on a first carrier, and numbers "21" and "22" are a first piece of CSI and a second piece of CSI on a second carrier.

It can be seen from the above embodiment that with the method above, the problem of feedback of CSI in a case where multiple carriers are combined with CoMP transmission may be solved, and transmission rate of the UE may be improved by the technology in which the CoMP transmission and carrier aggregation are combined.

When the UE triggers aperiodic report of CSI in a common space, if CSI report of a single cell is triggered only, the transmission method in Rel. 8 may be employed, and the method of this embodiment needs not to be employed.

In order to further obtain a good compromise between feedback overhead and system performance, the UE may perform down-selection of the aperiodic report of the CSI set configured by the base station.

Figure 6:
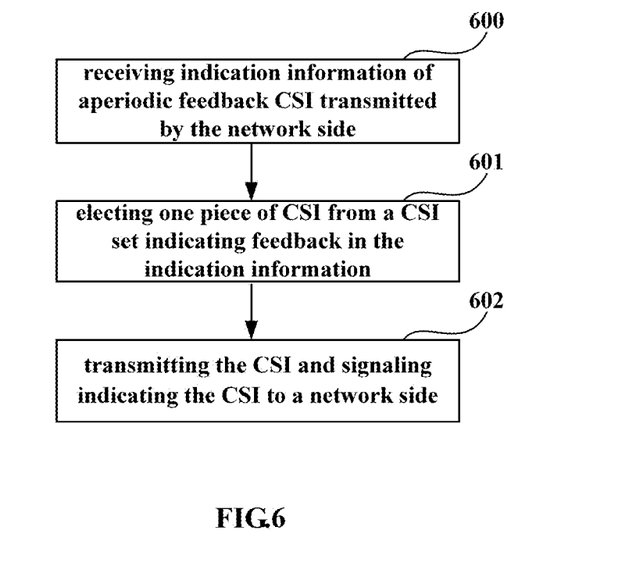
FIG. 6 is a flowchart of a method for feeding back channel state information of Embodiment 5 of the present invention.

FIG. 6 is a flowchart of a method for feeding back channel state information of Embodiment 5 of the present invention. As shown in FIG. 6, the method includes:

step 600: receiving indication information of aperiodic feedback CSI transmitted by the network side;

step 601: selecting one piece of CSI from a CSI set indicating feedback in the indication information;

in this embodiment, the UE may select optimal CSI from the CSI set according to the indication information; for example, CSI, or the like, transmitting a maximum amount of information, may be selected;

step 602: transmitting the selected one piece of channel state information and signaling indicating the selected channel state information to a network side;

in this embodiment, the signaling indicating the selected channel state information may be placed after precoding matrix indication information and/or channel quality indication information in the selected channel state information, and the signaling is bit signaling;

wherein, the number of bits is $\log_2^N$, N being a maximum number of bits; and a value of N is in consistent with the number of the configured CSI-RSs of non-zero power or the pre-configured number of pieces of the CSI of CSI set capable of performing aperiodic feedback.

Such a feedback manner may be carried out in certain specific aperiodic feedback modes, such as mode2-2; however, it is not limited thereto.

In this embodiment, in step 601, in order to support backoff, the UE may not only feed back one piece of optimally selected CSI, but also feed back CSI of a single cell for backoff. Wherein, the CSI of the single cell for backoff may be CSI defined by a first CSI-RS of non-zero power, or a first piece of CSI in the CSI set capable of performing aperiodic feedback configured by the base station for the UE, or the CSI of the single cell for backoff is determined by a CSI resource supporting backoff and configured via a high layer. In a feedback process, a CQI feedback information part in the CSI preferably selected by the UE and the CQI feedback information in the CSI for backoff are differentially encoded, so as to reduce feedback overhead. And in the feedback CSI, the piece of CSI preferably selected by the UE is arranged after the CSI of the single cell for backoff.

It can be seen from the above embodiment that for aperiodic feedback of CSI, the CSI may be fed back by concatenating in the bit domain, and taking joint transmission of CoMP and carriers into account, a corresponding method for feeding back CSI is also provided. For further obtaining a compromise between feedback overhead and system performance gain, the UE selects an optimal piece of CSI in a down-selection manner; and for supporting backoff, CSI of a single cell may also be selected.

A person of ordinary skill in the art may understand that all or part of the steps in the method carrying out the above embodiment may be carried out by related hardware instructed by a program. The program may be stored in a computer-readable storage medium. And when being executed, the program may include all or part of the steps in the method in the above embodiment, and the storage medium may include an ROM, an RAM, a floppy disc, and a compact disc, etc.

An embodiment of the present invention further provides UE feeding back CSI, as described in the embodiment below. As the principle of the UE for solving problems is similar to that of the above method for feeding back CSI, the implementation of the method may be referred to for the implementation of the UE, and the repeated parts shall not be described any further.

Figure 7:
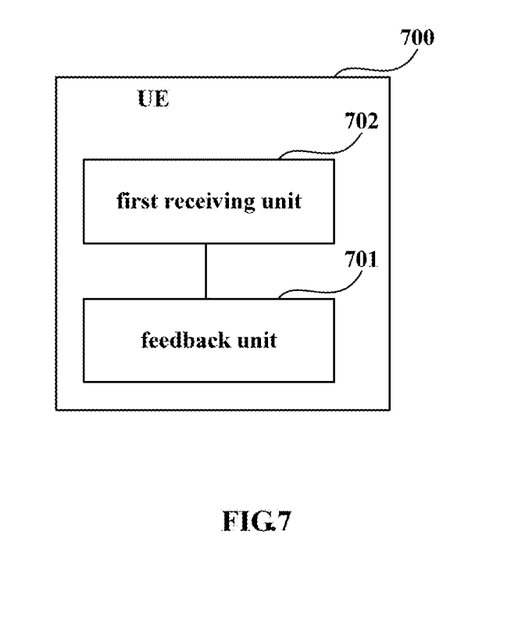
FIG. 7 is a schematic diagram of the structure of UE of Embodiment 6 of the present invention.

FIG. 7 is a schematic diagram of the structure of UE of Embodiment 6 of the present invention. As shown in FIG. 7, the UE 700 includes:

a feedback unit 701 configured to feed back CSI to a network side by way of concatenating more than one pieces of CSI in a bit domain.

In a case of aperiodically feeding back CSI, the UE further includes a first receiving unit 702 configured to receive indication information of aperiodic feedback CSI transmitted by the network side; in this way, the feedback unit 701 is configured to feed back the CSI according to the indication information.

In this embodiment, a working flow of the UE 700 is as described in Embodiment 1 shown in FIG. 1, which shall not be described herein any further.

In this embodiment, the feedback unit 701 independently concatenates rank indication information and precoding matrix indication information and/or channel quality indication information in the channel state information in the bit domain. Details are as described above Embodiments, which shall not be described herein any further.

Figure 8:
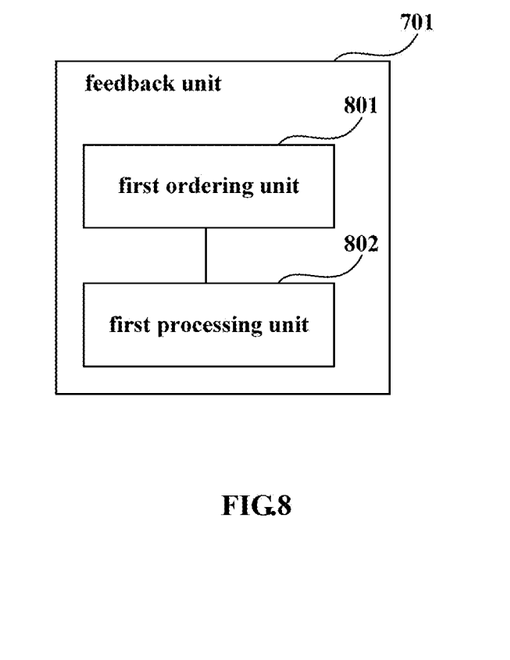
FIG. 8 is a schematic diagram of the structure of a feedback unit in FIG. 7.

FIG. 8 is a schematic diagram of the structure of the feedback unit in FIG. 7. As shown in FIG. 8, the feedback unit 701 includes: a first ordering unit 801 and a first processing unit 802; wherein, the first ordering unit 801 is configured to arrange the more than one pieces of CSI in a source bit domain; wherein, a manner of ordering is similar to step 201 of Embodiment 2, which shall not be described herein any further;

and the first processing unit 802 is configured to perform corresponding processing to the arranged more than one pieces of CSI and map them to a corresponding resource for transmitting to the network side. Wherein, the processes of processing and mapping are similar to step 202 of Embodiment 2, which shall not be described herein any further.

It can be seen from the above embodiment that in concatenating more than one pieces of CSI in the bit domain, ordering may be performed first, and then mapping to a corresponding resource is performed for transmitting after corresponding processing is performed.

Figure 9:
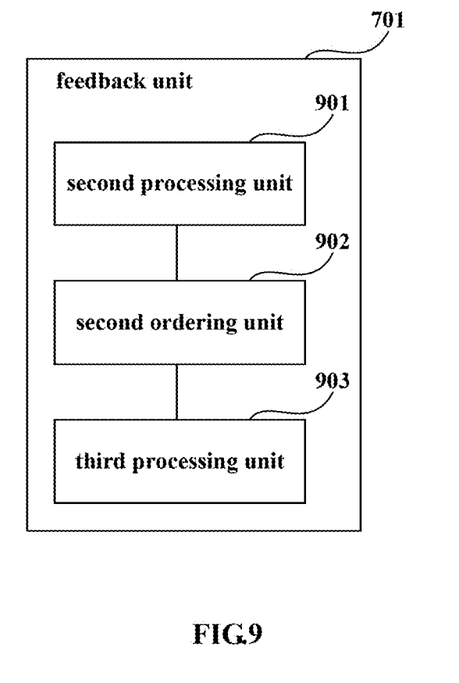
FIG. 9 is a schematic diagram of the structure of the feedback unit in FIG. 7.

FIG. 9 is a schematic diagram of the structure of the feedback unit in FIG. 7. As shown in FIG. 9, the feedback unit 701 includes: a second processing unit 901, a second ordering unit 902 and a third processing unit 903; wherein, the second processing unit 901 is configured to encode respectively the more than one pieces of CSI; wherein a method of encoding by the second processing unit 901 is as described in Embodiment 2, which shall not be described herein any further;

the second ordering unit 902 is configured to arrange the encoded more than one pieces of CSI in the bit domain; wherein a method of ordering by the second ordering unit 902 is similar to those described in embodiments 2 and 3, which shall not be described herein any further;

and the third processing unit 903 is configured to map the arranged more than one pieces of CSI to a corresponding resource, and transmit them to the network side; wherein a manner of mapping by the third processing unit 903 is as described in Embodiment 3, which shall not be described herein any further.

It can be seen from the above embodiment that in concatenating more than one pieces of CSI in the bit domain, they may be respectively encoded first, then ordered, and mapped to a corresponding resource for transmission.

In the above embodiment, when the CSI contains RI information and PMI/CQI information, the first processing unit 802 or the second processing unit 901 and the third processing unit 903 may independently process and map the RI information and PMI/CQI information, and order them in the bit domain respectively.

In the above embodiment, the first ordering unit 801 or the second ordering unit 902 is further configured to arrange the more than one pieces of channel state information in the source bit domain or arrange the encoded more than one pieces of channel state information in the bit domain in a fixed order or in a configured order of the channel state information. Details are as described in Embodiment 3, which shall not be described herein any further.

In this embodiment, the first ordering unit 801 or the second ordering unit 902 reserves one piece of the information when there exists identical two or more pieces of information restricted by an assumption in the more than one pieces of channel state information, so as to simplify a procedure of processing.

The UE feeding back CSI in a scenario where multiple carriers and the CoMP transmission are combined shall be described below.

Figure 10:
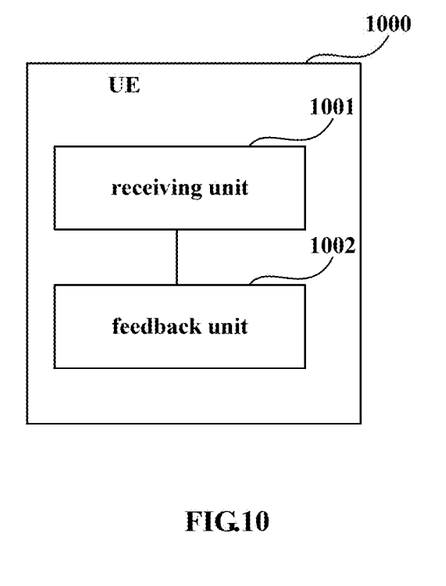
FIG. 10 is a schematic diagram of the structure of UE of Embodiment 7 of the present invention.

FIG. 10 is a schematic diagram of the structure of UE of Embodiment 7 of the present invention. As shown in FIG. 10, the UE 1000 includes a receiving unit 1001 and a feedback unit 1002; wherein the functions of the receiving unit 1001 and the feedback unit 1002 are similar to those described in Embodiment 6, with an exception that the CSI needing to be fed back indicated by the indication information received by the receiving unit 1001 includes: CSI needing to be fed back on different carriers, and CSI needing to be fed back in different transmission points and interference assumptions on the same carrier.

Figure 11A:
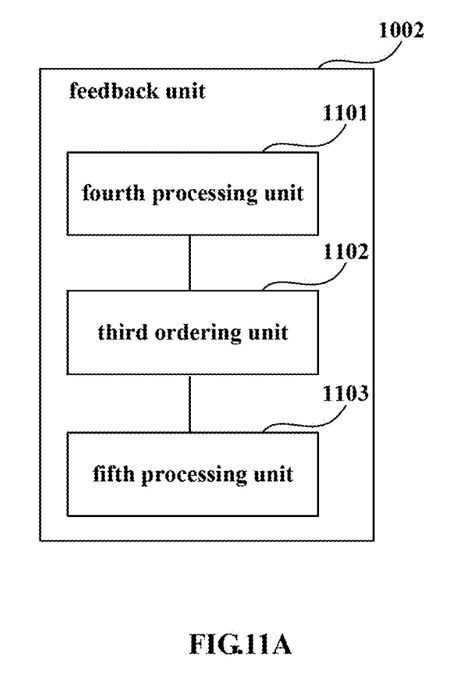
FIG. 11A is a schematic diagram of the structure of the feedback unit in Embodiment 7.

As shown in FIG. 11A, the feedback unit 1002 includes:
a fourth processing unit 1101 configured to concatenate respectively more than one pieces of channel state information in a corresponding transmission point of each cell; a third ordering unit 1102 configured to concatenate channel state information of all cells; and a fifth processing unit 1103 configured to encode the new concatenated state indication information of all the cells, and map it to corresponding resources to feed back to the network side.

The fourth processing unit 1101, the third ordering unit 1102 and the fifth processing unit 1103 in the above embodiment are similar to steps 501-503 in Embodiment 4, which shall not be described herein any further.

Figure 11B:
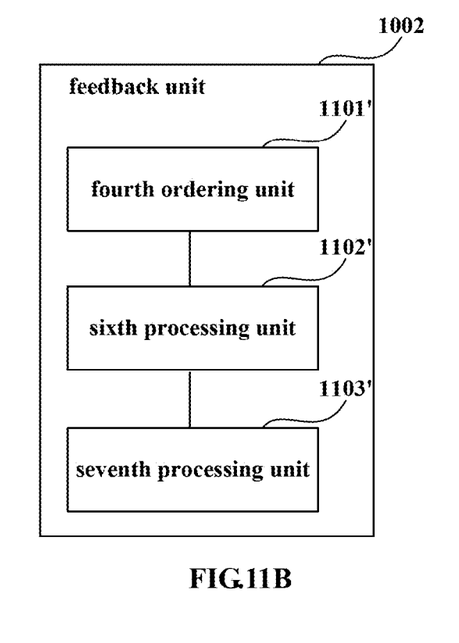
FIG. 11B is a schematic diagram of the structure of the feedback unit in Embodiment 7.

As shown in FIG. 11B, the feedback unit 1002 includes:
a fourth ordering unit 1101' configured to concatenate channel state information of all cells needing to feed back channel state information; a sixth processing unit 1102' configured to concatenate respectively more than one pieces of channel state information needed to be fed back for each cell; and a seventh processing unit 1103' configured to map the concatenated channel state information to corresponding resources to feed back to the network side. In this embodiment, the third ordering unit 1102 and the fourth ordering unit 1101' is further configured to arrange channel state information of all the cells in an ascending or descending order of the cells ID.

In order to further obtain a good compromise between feedback overhead and system performance, the UE may perform down-selection of the aperiodic report of the CSI set configured by the base station.

Figure 12:
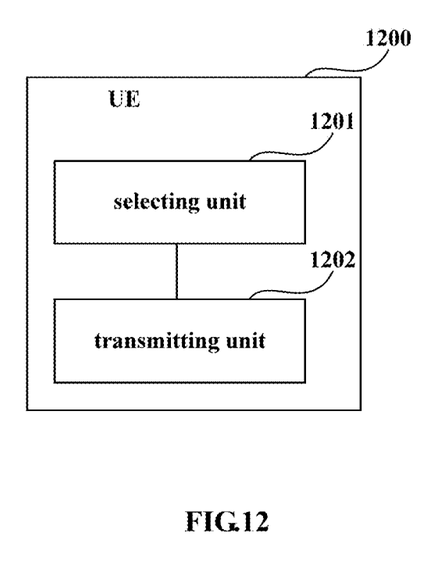
FIG. 12 is a schematic diagram of the structure of UE of Embodiment 8 of the present invention.

FIG. 12 is a schematic diagram of the structure of UE of Embodiment 8 of the present invention. As shown in FIG. 12, the UE 1200 includes: a selecting unit 1201 and a transmitting unit 1202; wherein, the selecting unit 1201 is configured to select one piece of channel state information from a preconfigured channel state information set for feeding back to a network side; and the transmitting unit 1202 is configured to transmit the selected channel state information to the network side.

In this embodiment, the transmitting unit 1202 is configured to transmit the selected channel state information and signaling indicating the selected channel state information to the network side.

Wherein, the bit signaling indicating the selected channel state information is placed after precoding matrix indication information and/or channel quality indication information in the selected channel state information.

In order to support backoff, the selecting unit 1201 of the UE 1200 may further select CSI of a single cell; wherein the channel state information of the single cell for backoff is channel state information to which a first channel state indication reference signal resource of non-zero power corresponds or a first piece of channel state information in the channel state information set, or the channel state information of the single cell for backoff is determined by a anchor channel state information resource supporting backoff configured via a high layer.

For aperiodic feedback, the UE 1200 may further include a second receiving unit (not shown) configured to receive indication information for aperiodically feeding back channel state information transmitted by the network side, and the selecting unit 1201 is further configured to select channel state information to be fed back to the network side according to the indication information.

In this embodiment, working processes of the selecting unit 1201 and the transmitting unit 1202 are similar to those in Embodiment 5, which shall not be described herein any further.

It can be seen from the above embodiment that for aperiodic feedback of CSI, the CSI may be fed back by concatenating in the bit domain, and taking joint transmission of CoMP and carriers into account, a corresponding method for feeding back CSI is also provided. For further obtaining a compromise between feedback overhead and system performance gain, the UE selects an optimal piece of CSI in a down-selection manner; and for supporting backoff, CSI of a single cell may also be selected.

Embodiment 9 of the present invention further provides a network system, including a macro base station, one or more pico base stations and UE; wherein the UE is the UE as described in the above embodiment, which shall not be described herein any further. And the macro base station and the pico base station(s) at the network side are configured to transmit to the UE indication information triggering aperiodic feedback.

An embodiment of the present invention further provides a computer-readable program, wherein when the program is executed in UE, the program enables a computer to carry out the method for feeding back channel state information as described in the above embodiments in the UE.

An embodiment of the present invention further provides a storage medium in which a computer-readable program is stored, wherein the computer-readable program enables a computer to carry out the method for feeding back channel state information as described in the above embodiments in UE.

In the above embodiment, the UE may any terminal equipment, such as a mobile phone, a PDA, and a computer, etc.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A terminal that feeds back a plurality of pieces of channel state information in coordinated multipoint transmission system to a base station, the terminal comprising:
a receiver configured to receive, from the base station, indication information for indicating aperiodic feedback of the channel state information;
a processor configured to map the plurality of pieces of channel state information to resources according to the indication information; and
a transmitter configured to transmit the plurality of pieces of channel state information mapped by the processor, wherein the processor is configured to sort the plurality of pieces of channel state information based on a CSI-RS (Channel State Information Reference Signals) resource of non-zero power or an interference part measurement resource corresponding to the CSI-RS resource of non-zero power and concatenate a plurality of rank indication information included in each of the plurality of pieces of channel state information in a bit domain.

2. The terminal according to claim 1, wherein
the processor is configured to sort, in an order of feeding back, a first plurality of pieces of the channel state information corresponding to the CSI-RS resource of non-zero power in the plurality of pieces of the channel state information.

3. The terminal according to claim 2, wherein
the processor is further configured to sort, in an order of predetermined interference part measurement resource, the plurality of pieces of the channel state information corresponding to each of a plurality of CSI-RS resources of non-zero power.

4. The terminal according to claim 1, wherein
the processor is further configured to sort the plurality of pieces of the channel state information in an ascending order of cell IDs.

5. A terminal that feeds back a plurality of pieces of channel state information in coordinated multipoint transmission system to a base station, the terminal comprising:
a receiver configured to receive, from the base station, indication information for indicating aperiodic feedback of the channel state information;
a processor configured to map the plurality of pieces of channel state information to resources; and
a transmitter configured to transmit the plurality of pieces of channel state information mapped by the processor,
wherein the processor is configured to sort and concatenate at least one of a plurality of pieces of precoding matrix indication information and a plurality of pieces of channel quality indication information included in each of the plurality of pieces of channel state information in a bit domain by using a CSI-RS (Channel State Information Reference Signals) resource of non-zero power or an interference part measurement resource corresponding to the CSI-RS resource of non-zero power.

6. A method for feeding back a plurality of pieces of channel state information in coordinated multipoint transmission system to a base station, the method comprising:
receiving, from the base station, indication information for indicating aperiodic feedback of the channel state information;
mapping the plurality of pieces of channel state information to resources according to the indication information; and
transmitting the mapped plurality of pieces of channel state information,
wherein the mapping is configured to sort the plurality of pieces of channel state information based on a CSI-RS (Channel State Information Reference Signals) resource of non-zero power or an interference part measurement resource corresponding to the CSI-RS resource of non-zero power and concatenate a plurality of rank indication information included in each of the plurality of pieces of channel state information in a bit domain.

7. A method for feeding back a plurality of pieces of channel state information in coordinated multipoint transmission system to a base station, the method comprising:
receiving, from the base station, indication information for indicating aperiodic feedback of the channel state information;
mapping the plurality of pieces of channel state information to resources; and
transmitting the mapped plurality of pieces of channel state information,
wherein the mapping is configured to sort and concatenate at least one of a plurality of pieces of precoding matrix indication information and a plurality of pieces of channel quality indication information included in each of the plurality of pieces of channel state information in a bit domain by using a CSI-RS (Channel State Information Reference Signals) resource of non-zero power or an interference part measurement resource corresponding to the CSI-RS resource of non-zero power.

* * * * *